United States Patent
Pandit et al.

(10) Patent No.: US 12,077,188 B2
(45) Date of Patent: Sep. 3, 2024

(54) LEVERAGING WEATHER INFORMATION TO IMPROVE PASSENGER PICKUP AND DROP OFFS FOR AUTONOMOUS VEHICLES

(71) Applicant: Waymo LLC, Mountain View, CA (US)

(72) Inventors: Salil Pandit, Palo Alto, CA (US); Robert Chen, San Francisco, CA (US); Bruce Mai, Sacramento, CA (US)

(73) Assignee: Waymo LLC, Mountain View, CA (US)

( * ) Notice: Subject to any disclaimer, the term of this patent is extended or adjusted under 35 U.S.C. 154(b) by 363 days.

(21) Appl. No.: 17/028,428

(22) Filed: Sep. 22, 2020

(65) Prior Publication Data

US 2022/0089189 A1    Mar. 24, 2022

(51) Int. Cl.
*B60W 60/00* (2020.01)
*G01C 21/34* (2006.01)
(Continued)

(52) U.S. Cl.
CPC ..... *B60W 60/0025* (2020.02); *G01C 21/3453* (2013.01); *G01C 21/3691* (2013.01);
(Continued)

(58) Field of Classification Search
CPC ........ B60W 60/0025; B60W 2555/20; B60W 60/0024; B60W 60/001; G01C 21/3453;
(Continued)

(56) References Cited

U.S. PATENT DOCUMENTS 8,185,299 B2   5/2012  Fujiwara et al.
9,650,051 B2   5/2017  Hoye et al.
(Continued)

FOREIGN PATENT DOCUMENTS

CN   110647143 A   1/2020
CN   111033427 A   4/2020
(Continued)

OTHER PUBLICATIONS

The Extended European Search Report for European Patent Application No. 21186695.9, Jan. 7, 2022.
(Continued)

*Primary Examiner* — Peter D Nolan
*Assistant Examiner* — Peter Y Ning
(74) *Attorney, Agent, or Firm* — Botos Churchill IP Law

(57) ABSTRACT

Aspects of the disclosure relate to providing transportation services with autonomous vehicles. For instance, a first route to a first destination may be determined. The first route may have a first cost. Weather information for the first destination may be received. A characteristic is determined based on the weather information. A second destination having the characteristic may be selected. The second destination may be different from the first destination. A second route to the second destination may be determined. The second route may have a second cost. The first cost may be compared to the second cost, and the vehicle may use the comparison to set one of the first destination or the second destination as a current destination for a vehicle to cause the vehicle to control itself in an autonomous driving mode to the current destination.

22 Claims, 10 Drawing Sheets

(51) Int. Cl.
    *G01C 21/36*     (2006.01)
    *G05D 1/00*     (2006.01)
    *G08G 1/133*     (2006.01)

(52) U.S. Cl.
    CPC ........... *G05D 1/0088* (2013.01); *G08G 1/133* (2013.01); *B60W 2555/20* (2020.02)

(58) Field of Classification Search
    CPC ............ G01C 21/3691; G01C 21/3415; G05D 1/0088; G05D 2201/0213; G08G 1/133; G06Q 10/047; G06Q 50/30
    See application file for complete search history.

(56) References Cited

U.S. PATENT DOCUMENTS

| | | | |
|---|---|---|---|
| 9,733,096 B2 | 8/2017 | Colijn et al. | |
| 10,379,533 B2 | 8/2019 | Bier et al. | |
| 10,429,199 B2 | 10/2019 | Mason et al. | |
| 10,520,941 B2 | 12/2019 | Herbach et al. | |
| 10,533,870 B1* | 1/2020 | Slusar | G01C 21/3623 |
| 11,334,951 B1* | 5/2022 | Kolls | G06Q 20/145 |
| 2014/0324266 A1* | 10/2014 | Zhu | G01S 13/865 |
| | | | 382/104 |
| 2017/0148316 A1 | 5/2017 | Curlander | |
| 2018/0326997 A1* | 11/2018 | Sweeney | G01C 21/3438 |
| 2019/0049946 A1 | 2/2019 | Ross et al. | |
| 2019/0066003 A1* | 2/2019 | Dyer | G01C 21/343 |
| 2019/0120640 A1* | 4/2019 | Ho | G01C 21/3453 |
| 2019/0146508 A1* | 5/2019 | Dean | G05D 1/0274 |
| | | | 701/26 |
| 2020/0004250 A1* | 1/2020 | Mangal | G08G 1/096838 |
| 2020/0049517 A1* | 2/2020 | Sweeney | G01C 21/3423 |
| 2020/0311846 A1* | 10/2020 | Chen | G06Q 50/40 |
| 2022/0221867 A1* | 7/2022 | Taveira | G05D 1/0214 |
| 2022/0404162 A1* | 12/2022 | Williams | G08G 1/202 |

FOREIGN PATENT DOCUMENTS

| | | |
|---|---|---|
| DE | 102017006154 A1 | 12/2017 |
| EP | 3588008 A1 | 1/2020 |
| WO | 2019040431 A1 | 2/2019 |

OTHER PUBLICATIONS

The First Office Action for Chinese Patent Application No. 202110935786.6, Jan. 8, 2024, 20 Pages.

\* cited by examiner

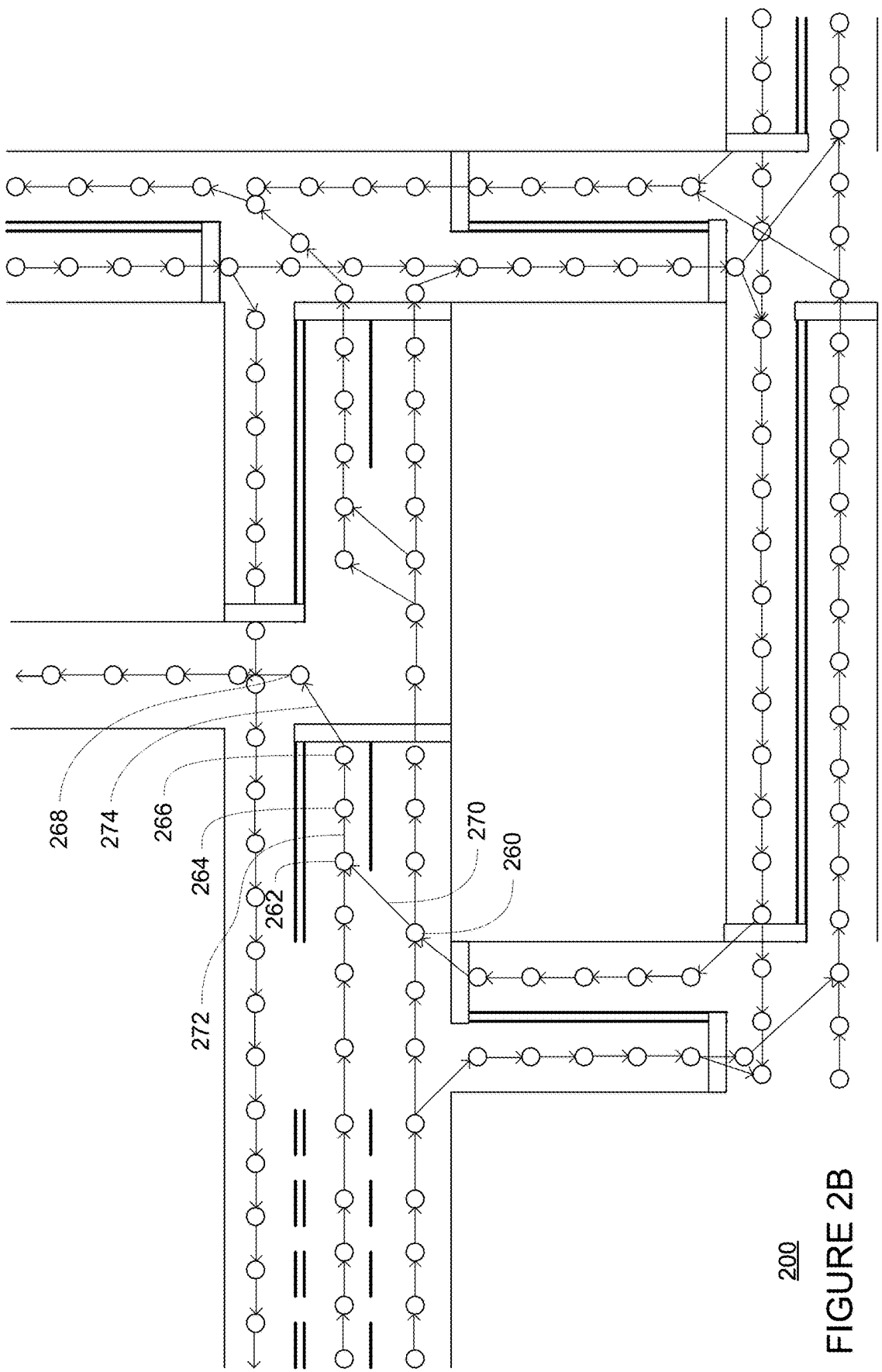

LEVERAGING WEATHER INFORMATION TO IMPROVE PASSENGER PICKUP AND DROP OFFS FOR AUTONOMOUS VEHICLES

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, LIDAR, and other devices that scan and record data from the vehicle's surroundings.

BRIEF SUMMARY

Aspects of the disclosure provide a method of providing transportation services with autonomous vehicles. The method includes determining, by one or more processors, a first route to a first destination, the first route having a first cost; receiving, by the one or more processors, weather information for the first destination; determining, by the one or more processors, a characteristic based on the weather information; selecting, by the one or more processors, a second destination having the characteristic, the second destination being different from the first destination; determining, by the one or more processors, a second route to the second destination, the second route having a second cost; comparing, by the one or more processors, the first cost to the second cost; and using, by the one or more processors, the comparison to set one of the first destination or the second destination as a current destination for a vehicle to cause the vehicle to control itself in an autonomous driving mode to the current destination.

In one example, the first destination is a drop off location for a passenger. In another example, the first destination is a pick-up location for a passenger. In another example, the one or more processors are one or more processors of one or more server computing devices and using the comparison to set one of the first destination or the second destination as a current destination for the vehicle further includes sending the one of the first destination or the second destination to the vehicle to cause the vehicle to set the one of the first destination or the second destination as the current destination for the vehicle. In another example, the one or more processors are one or more processors of the vehicle, and the method further includes controlling the vehicle to the current destination in an autonomous driving mode. In another example, the method further includes comparing the weather information to one or more thresholds and using the comparison of the weather information to one or more thresholds to determine the characteristic. In this example, the weather information includes a precipitation rate. In addition or alternatively, the weather information includes a temperature. In addition or alternatively, the characteristic is associated with one of the one or more thresholds that is met by the weather information. In another example, the comparison includes determining a difference between the first cost and the second cost, and comparing the difference to a threshold value. In this example, when the difference meets the threshold value, providing a notification to a passenger assigned to the vehicle requesting that the passenger select between the first destination and the second destination. In this example, the notification identifies a weather condition based on the weather information. In addition or alternatively, the method also includes receiving a selection in response to the notification, and wherein the received selection is used to set the one of the first destination or the second destination as the current destination of the vehicle. In addition or alternatively, when the difference meets the threshold value, the second destination is set as the current destination of the vehicle.

Another aspect of the disclosure provides a system for providing transportation services with autonomous vehicles. The system includes one or more processors configured to determine a first route to a first destination, the first route having a first cost; receive weather information for the first destination; determine a characteristic based on the weather information; select a second destination having the characteristic, the second destination being different from the first destination; determine a second route to the second destination, the second route having a second cost; compare the first cost to the second cost; and use the comparison to set one of the first destination or the second destination as a current destination for a vehicle to cause the vehicle to control itself in an autonomous driving mode to the current destination.

In one example, the one or more processors are further configured to compare the weather information to one or more thresholds, and use the comparison of the weather information to one or more thresholds to determine the characteristic. In this example, the characteristic is associated with one of the one or more thresholds that is met by the weather information. In another example, the one or more processors are further configured to compare the first cost to the second cost by determining a difference between the first cost and the second cost, and comparing the difference to a threshold value. In another example, the one or more processors are further configured to, when the difference meets the threshold value, provide a notification to a passenger assigned to the vehicle requesting that the passenger select between the first destination and the second destination. In another example, the system also includes the vehicle, wherein the processors are processors of the vehicle.

BRIEF DESCRIPTION OF THE DRAWINGS

FIGS. 2A-2B are an example of map information in accordance with aspects of the disclosure.

DETAILED DESCRIPTION

Overview

Figure 1:
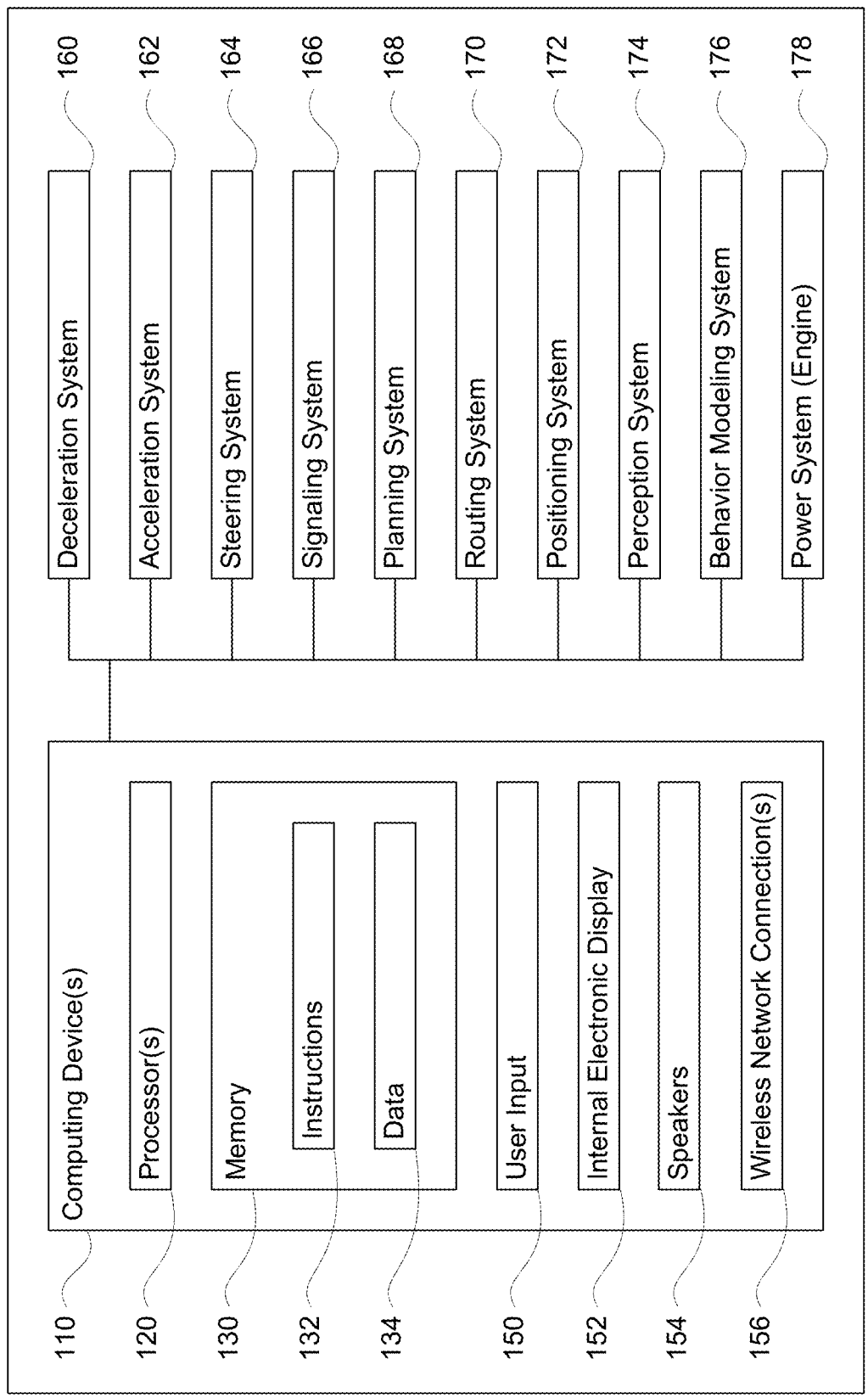
FIG. 1 is a functional diagram of an example vehicle in accordance with an exemplary embodiment.

Aspects of the disclosure relate to providing transportation services to passengers using autonomous vehicles. In particular such services can use weather information to improve user experience during pick up, drop off, and during rides. For instance, pickups, drop offs, and routes can all be optimized either at an autonomous vehicle or at a remote computing device (i.e. a dispatching server computing device) in order to reduce the impacts of weather conditions on passengers, thereby improving the overall rider experience.

In order to do so, the vehicle and/or the server computing device may be able to access information about current or predicted weather conditions. In some examples, current weather conditions can be determined using onboard vehicle sensors and sharing this information with other vehicles and/or the server computing device. For example, the operation and speed of windshield wipers, wheel slippage detection, as well as LIDAR, radar, camera and other sensors can all be used to detect current weather conditions (e.g. precipitation, sun glare, etc.). In addition or alternatively, current and predicted weather conditions may be retrieved from third party weather sources which can provide information such as rates of precipitation, sun glare angles, slippery road conditions, temperatures, puddle conditions, etc.

The server computing device and/or a routing system of the vehicle may periodically determine a first route to the vehicle's current destination. This destination may be a pickup or drop off location for the passenger. This first route may be an optimal route that is determined using a cost function which calculates the costs of reaching the destination from the current location of the vehicle.

The server computing device and/or the routing system or some other system of the vehicle may determine whether any weather conditions thresholds are met for the destination either currently or at the time when the vehicle would be expected to reach the destination if following the determined route. For instance, any weather conditions along the route may be compared to one or more thresholds. If a threshold is met, the server computing device and/or the routing system or some other system of the vehicle may conduct a search for a new, nearby destination. The search may be conducted based upon the type of weather condition that met the threshold.

The server computing device and/or the routing system may then determine a second route to the new destination. This second route may be determined in a manner similar to the first route discussed above. The overall cost of the second route may be compared to the overall cost of the first route. If the difference is less than a first threshold (e.g. a small difference), the server computing device and/or the routing system may automatically cause the vehicle to follow the second route to the new destination. If the difference is greater than a second threshold (e.g. a moderate difference), the server computing devices and/or the route system may cause a notification to be displayed to the passenger at the vehicle and/or at the passenger's client computing device providing the passenger with an option to select either the first route or the second route. The passenger may then be able to provide input at the vehicle or the client computing device selecting one of the routes and/or destinations. In response to the selection, the server computing devices and/or the route system may cause the vehicle to route itself using the selected route and/or destination.

The features described herein may provide an improved user experience for transportation services provided by autonomous vehicles. For instance, by leveraging certain weather information, this can be used to choose better pickup or drop off locations which can greatly delight a customer and deliver more confidence in the advanced capabilities of the transportation service. For example, pickup and drop offs of passengers or goods may be improved by avoiding or reducing the effects of certain weather conditions such as precipitation, sun glare, slippery road conditions, fog, haboobs, temperatures, puddle conditions, etc.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone), various electronic displays (e.g., a monitor having a screen or any other electrical device that is operable to display information), and speakers 154 to provide information to a passenger of the vehicle 100 as needed. For example, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The autonomous control system 176 may include various computing devices, configured similarly to computing devices 110, capable of communicating with various components of the vehicle in order to control the vehicle in an autonomous driving mode. For example, returning to FIG. 1, the autonomous control system 176 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 134 of memory 130 in the autonomous driving mode.

As an example, a computing device of the autonomous control system 176 may interact with deceleration system 160 and acceleration system 162 in order to control the speed of the vehicle. Similarly, steering system 164 may be used by autonomous control system 176 in order to control the direction of vehicle 100. For example, if vehicle 100 is configured for use on a road, such as a car or truck, the steering system may include components to control the angle of wheels to turn the vehicle. The autonomous control system 176 may also use the signaling system in order to signal the vehicle's intent to other drivers or vehicles, for example, by lighting turn signals or brake lights when needed.

Routing system 166 may be used by the autonomous control system 176 in order to generate a route to a destination. Planning system 168 may be used by computing device 110 in order to follow the route. In this regard, the planning system 168 and/or routing system 166 may store detailed map information, e.g., highly detailed maps identifying a road network including the shape and elevation of roadways, lane lines, intersections, crosswalks, speed limits, traffic signals, buildings, signs, real time traffic information, pullover spots, vegetation, or other such objects and information.

Figure 2A:
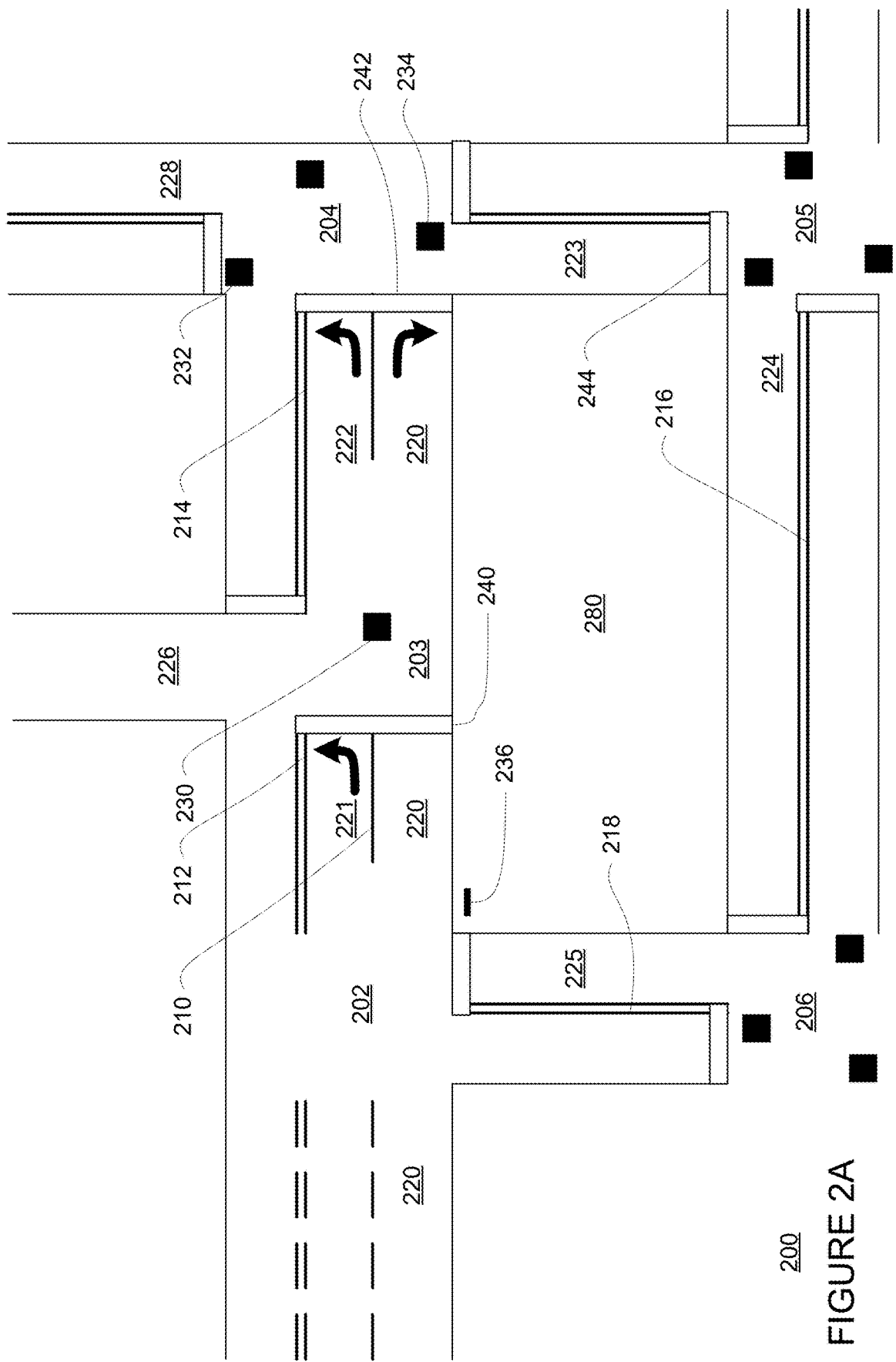

FIGS. 2A and 2B are an example of map information 200 for a small section of roadway including intersections 202, 203, 204, 205, 206. FIG. 2A depicts a portion of the map information 200 that includes information identifying the shape, location, and other characteristics of lane markers or lane lines 210, 212, 214, 216, 218, lanes 220, 221, 222, 223, 224, 225, 226, 228, traffic control devices including traffic signal lights 230, 232, 234 and stop sign 236 (not depicted in FIG. 2B for clarity), stop lines 240, 242, 244, as well as a non-drivable area 280. In this example, lane 221 approaching intersection 204 is a left turn only lane, lane 222 approaching intersection 206 is a left turn only lane, and lane 226 is a one-way street where the direction of traffic moves away from intersection 204. In addition to the aforementioned features, the map information may also include information that identifies the direction of traffic for each lane as well as information that allows the computing devices 110 to determine whether the vehicle has the right of way to complete a particular maneuver (i.e. complete a turn or cross a lane of traffic or intersection).

Although the map information is depicted herein as an image-based map, the map information need not be entirely image based (for example, raster). For instance, the map information may include one or more roadgraphs, graph networks or road networks of information such as roads, lanes, intersections, and the connections between these features which may be represented by road segments. Each feature in the map may also be stored as graph data and may be associated with information such as a geographic location and whether or not it is linked to other related features, for example, a stop sign may be linked to a road and an intersection, etc. In some examples, the associated data may include grid-based indices of a road network to allow for efficient lookup of certain road network features.

In this regard, in addition to the aforementioned physical feature information, the map information may include a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes.

For instance, FIG. 2B depicts most of the map information of FIG. 2A with the addition of a plurality of edges represented by arrows and graph nodes (depicted as circles) corresponding to the road network of map information 200. Though many edges and graph nodes are depicted, only a few are referenced for clarity and simplicity. For example, FIG. 2B includes edges 270, 272, 274 arranged between pairs of starting and ending graph nodes as graph nodes 260, 262, 264, 266. As can be seen, graph nodes 260 represents a starting point for edge 270, and graph nodes 262 represents an ending point for edge 270. Similarly, graph node 262 represents a starting point for edge 272, and graph node 264 represents an ending point for edge 272. In addition, graph node 266 represents a starting point for edge 274, and graph node 268 represents an ending point for edge 274. Again, the direction of each of these graph nodes is represented by the arrow of the edge. Edge 270 may represent a path a vehicle can follow to change from lane 220 to lane 221, edge 272 may represent a path that a vehicle can follow within lane 220, and edge 274 may represent a path a vehicle can follow to make a left turn at intersection 203 in order to move from lane 221 to lane 226. Although not shown, each of these edges may be associated with an identifier, for instance, a numeric value corresponding to a relative or actual location of the edge or simply the locations of the starting and ending graph nodes. In this regard, edges and graph nodes may be used to determine how to route and plan routes and trajectories between locations, change lanes and make other maneuvers, though in operation, the vehicle 100 need not follow the nodes and edges exactly.

The routing system 166 may use the roadgraph to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

Positioning system 172 may be used by autonomous control system 176 in order to determine the vehicle's relative or absolute position on a map or on the earth. For example, the positioning system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 170 may also include other devices in communication with the computing devices autonomous control system 176, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
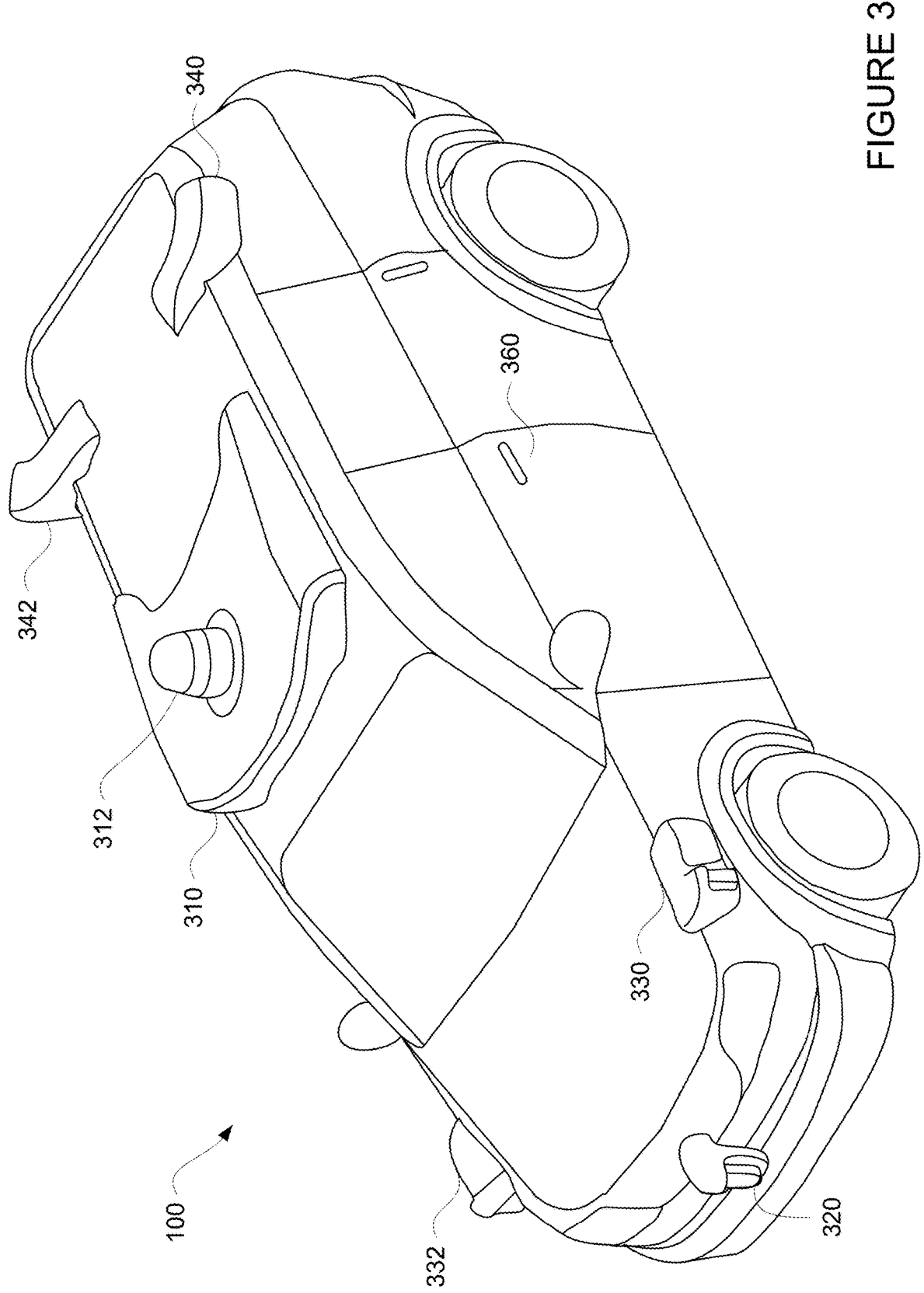
FIG. 3 is an example external view of a vehicle in accordance with aspects of the disclosure.

The perception system 174 also includes one or more components for detecting objects external to the vehicle such as other vehicles, obstacles in the roadway, traffic signals, signs, trees, etc. For example, the perception system 174 may include lasers, sonar, radar, cameras and/or any other detection devices that record data which may be processed by the computing devices of the autonomous control system 176. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The autonomous control system 176 may be capable of communicating with various components of the vehicle in order to control the movement of vehicle 100 according to primary vehicle control code of memory of the autonomous control system 176. For example, returning to FIG. 1, the autonomous control system 176 may include various computing devices in communication with various systems of vehicle 100, such as deceleration system 160, acceleration system 162, steering system 164, planning system 168, routing system 170, positioning system 172, perception system 174, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 166. In this regard, the trajectories may define the specific characteristics of acceleration, deceleration, speed, etc. to allow the vehicle to follow the route towards reaching a destination. A control system software module of the autonomous control system 176 may be configured to control movement of the vehicle, for instance by controlling braking, acceleration and steering of the vehicle, in order to follow a trajectory.

The autonomous control system 176 may control the vehicle in an autonomous driving mode by controlling various components. For instance, by way of example, the autonomous control system 176 may navigate the vehicle to a destination location completely autonomously using data from the detailed map information and planning system 168. The autonomous control system 176 may use the positioning system 170 to determine the vehicle's location and perception system 172 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals). Thus, the acceleration system 162 and deceleration system 160 may be a part of a drivetrain that includes various components between an engine of the vehicle and the wheels of the vehicle. Again, by controlling these systems, autonomous control system 176 may also control the drivetrain of the vehicle in order to maneuver the vehicle autonomously.

Figure 4:
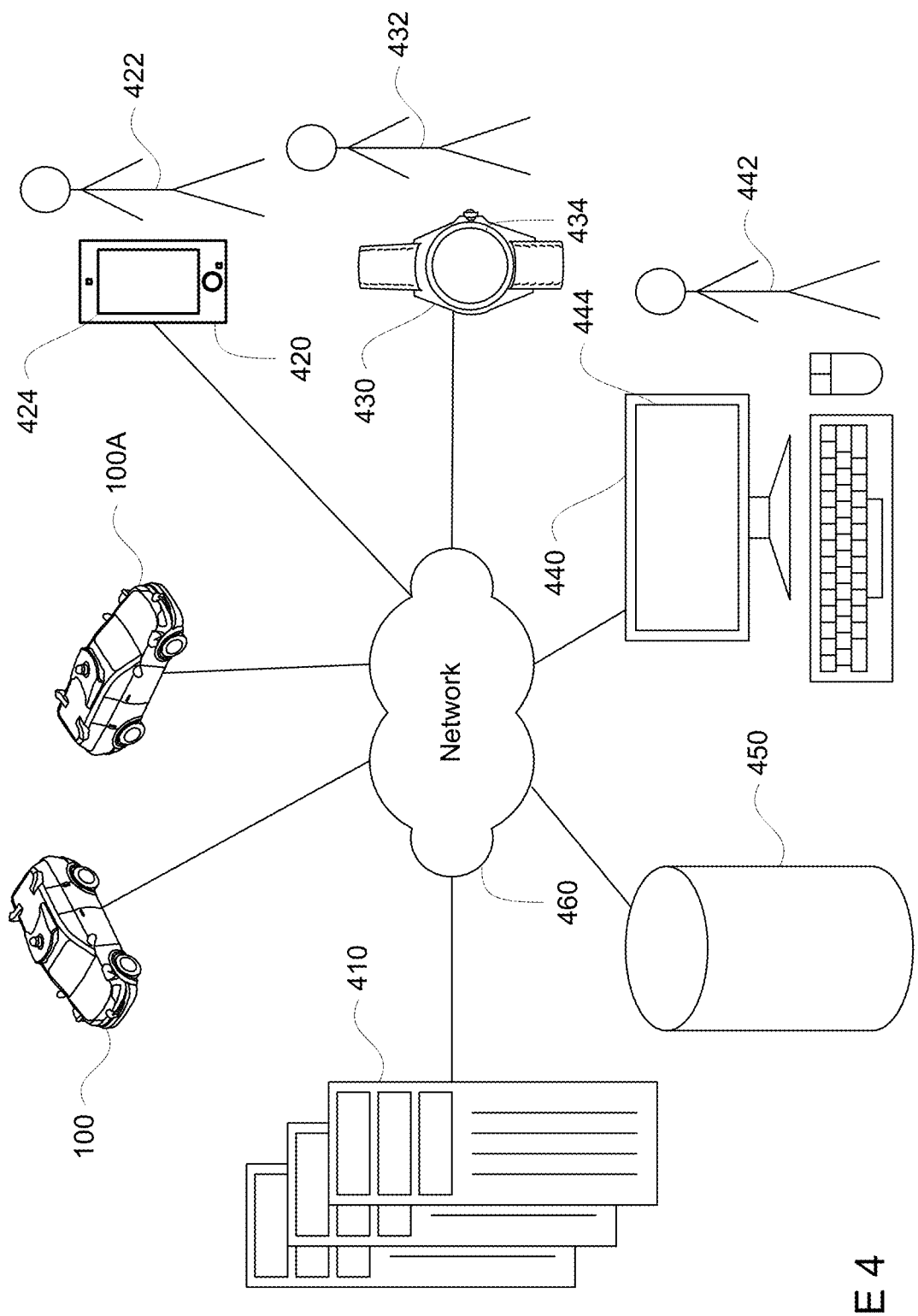
FIG. 4 is a pictorial diagram of an example system in accordance with aspects of the disclosure.
Figure 5:
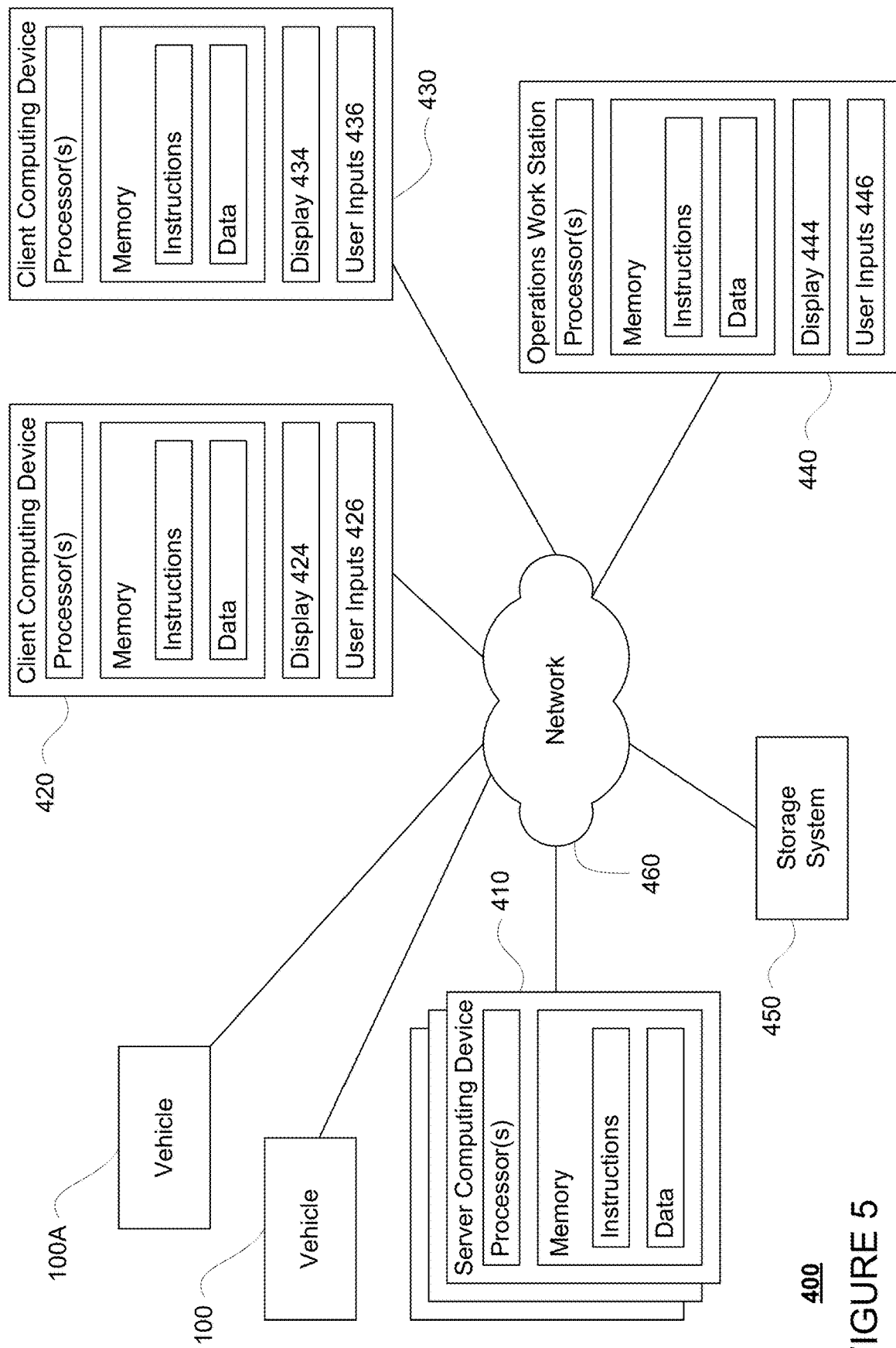
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100 and vehicle 100A, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching server computing system which can be used to assign passengers to vehicles, such as vehicle 100 and vehicle 100A, and dispatch those vehicles to different locations in order to pick up and drop off passengers. In addition, server computing devices 410 may use network 460 to transmit and present information to a user and/or an assigned passenger, such as user 422, 432, 442 on a display, such as displays 424, 434, 444 of computing devices 420, 430, 440 and/or display 152 of the vehicles 100, 100A. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 420 may be a mobile phone used by a passenger of a vehicle. In other words, in some instances, user 422 may represent a passenger assigned to the vehicle 100. In addition, client communication device 430 may represent a smart watch for a passenger of a vehicle. In other words, in other instances, user 432 may represent a passenger assigned to the vehicle 100. The client communication device 440 may represent a workstation for an operations person, for example, a remote assistance operator or someone who may provide remote assistance to a vehicle and/or a passenger. In other words, user 442 may represent a remote assistance operator. Although only a few passengers and operations person are shown in FIGS. 4 and 5, any number of such passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 110, and in response, receive the application. The application may be installed locally at the client computing device.

The user may then use his or her client computing device to access the application and request a vehicle. As an example, a user such as user 432 may use client computing device 430 to send a request to one or more server computing devices 110 for a vehicle. As part of this, the user may identify a pickup location, a destination location, a pickup location and a drop off location. In this regard, the drop off location may be a physically different location from a destination location.

A user or passenger may specify a pick up, intermediate destination, and final destination locations in various ways. As an example, a pickup location can be defaulted to current location of the passenger's client computing device, but may also be a recent or saved location near the current location associated with the passenger's account. The passenger may enter an address or other location information, tap a location on a map or select a location from a list in order to identify a pickup and/or destination location. For instance, the client computing device 420 may send its current location, such as a GPS location, to the one or more server computing devices 110 via network 460 and/or a destination name or address for any intermediate and the final destination. In response, the server computing devices 410 may provide one or more suggested locations or may identify the current location as a pickup location and locations corresponding to the destination name or address as an intermediate or final destination for the vehicle. One the user (now a passenger) has selected or confirmed the pickup and destination locations, the server computing devices may assign a vehicle, such as vehicle 100, to the passenger and the passenger's trip and send dispatching instructions to the vehicle including the pickup location, an intermediate destination, and the final destination. This may cause the vehicle to control itself in the autonomous driving mode towards the pickup location, for instance by using the various systems of the vehicle as described above, in order to complete the trip. Although the examples herein relate to transporting passengers, similar features may be used for the transportation of goods or cargo.

Figure 9:
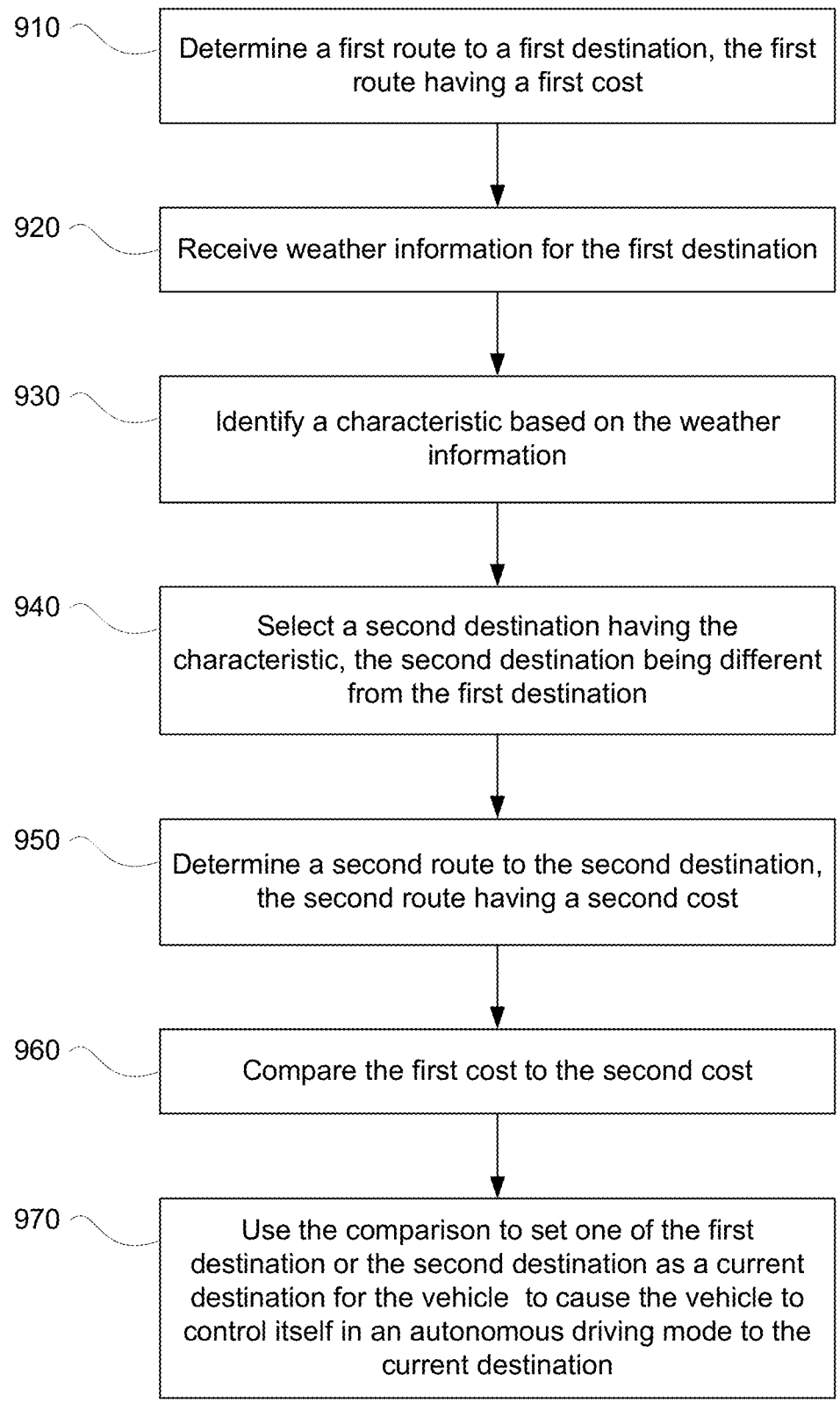
FIG. 9 is an example flow diagram in accordance with aspects of the disclosure.

FIG. 9 provides an example flow diagram 900 for providing transportation services with autonomous vehicles which may be performed by one or more processors of one or more computing devices such as the processors 120 of computing devices 110 in conjunction with the routing system 170 or the processors of the server computing devices 410. For instance, at block 910, a first route to a first destination is determined. This first route has a first cost. For instance, the server computing devices 410 and/or the routing system of the vehicle may periodically determine a first route to the vehicle's current destination. This destination may be a pickup or drop off location for the passenger or even an intermediate destination (e.g. where a passenger may temporarily exit a vehicle, return to it, and thereafter continue on to the destination and/or another intermediate destination.

This first route may be an optimal route that is determined using a cost function which calculates the costs of reaching the destination from the current location of the vehicle as described above. For instance, the first route may be selected from a plurality of possible routes by doing a graph search through map information including a plurality of nodes connected by edges. Each node may have an associated cost such that the first route is the one with the lowest overall cost. This overall cost may include, for instance, a sum of all of the costs of the nodes and/or edges of a route. This overall cost may also be a proxy for a total trip time for the route. In addition, an estimated time of arrival may be determined for the vehicle to reach the destination using the first route.

Figure 6:
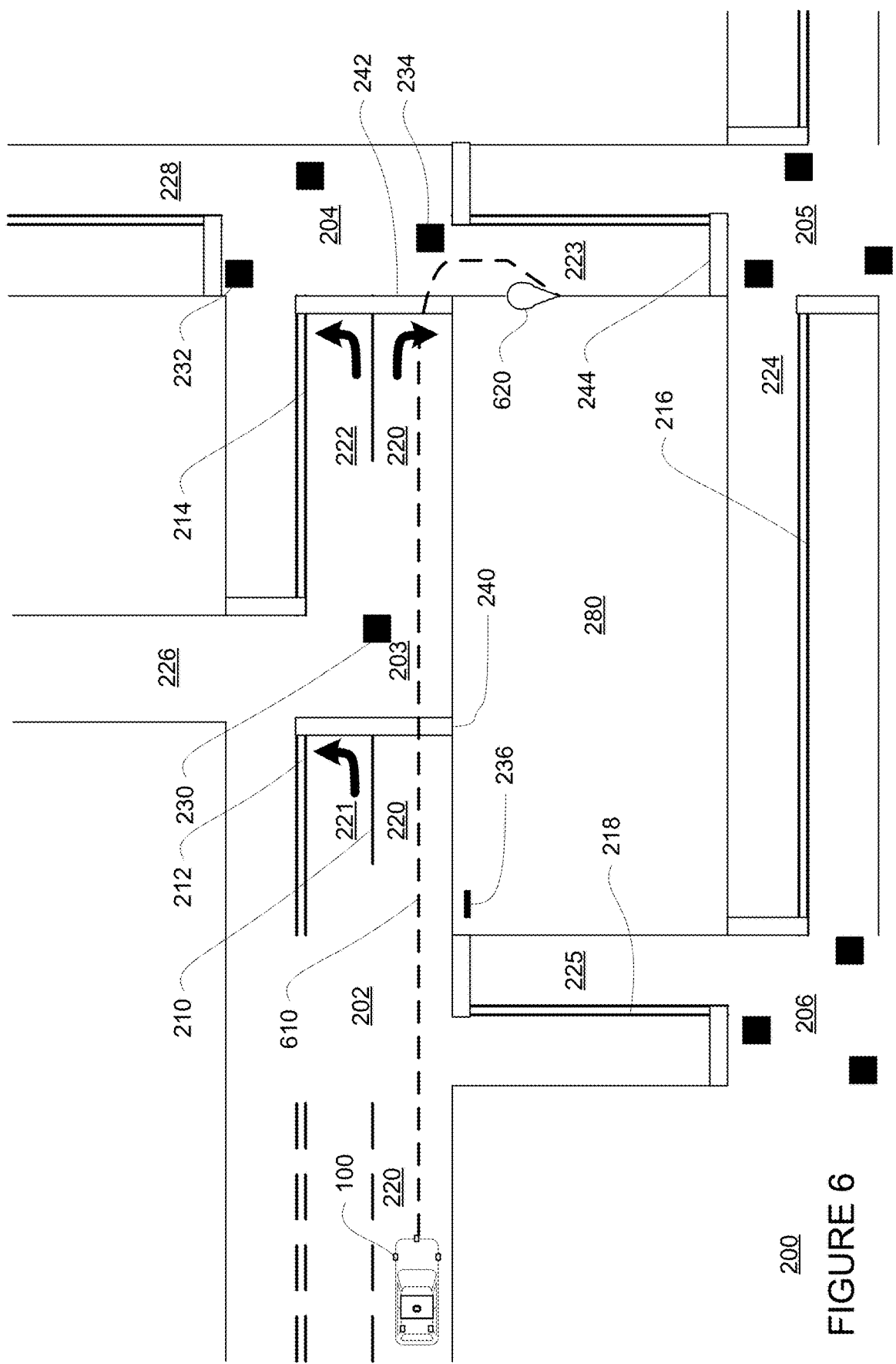
FIG. 6 is an example representation of a first route to a first destination in accordance with aspects of the disclosure.

FIG. 6 provides an example of a first route 610 to a first destination 620 represented with respect to the map information 200. For example, vehicle 100 may follow the first route 610 to reach the first destination 620 autonomously using the various systems of the vehicle as described above. In this example, this first destination may be a pickup or a drop off destination for a passenger, such as users 442 or 443. The first route 610 may be associated with a first cost "X" which as noted above may be a sum of all of the nodes and/or edges along the first route.

Returning to FIG. 9, at block 920, weather information for the first destination is received. For instance, the computing devices 110 of the vehicle 100 and/or the server computing devices 410 may be able to access information about current or predicted weather conditions. In some examples, current weather conditions can be determined using onboard vehicle sensors and sharing this information with other vehicles (e.g. from vehicle 100 to vehicle 100A and vice versa) and/or the server computing devices 410. For example, the operation and speed of windshield wipers, triggering of fog lights, temperature sensors, wind speed gauges or determinations from data from other sensors, wheel slippage detection, as well as LIDAR, radar, camera and other sensors can all be used to detect current weather conditions (e.g. precipitation, sun glare, etc.). In addition or alternatively, current and predicted weather conditions may be retrieved from third party weather sources which can provide information such as rates of precipitation, sun glare angles, slippery road conditions, fog, haboobs, temperatures, puddle conditions, etc.

For example, returning to the example of FIG. 6, the ambient temperature at the location of the first destination 620 and/or the area of the map information 200 as depicted in FIG. 6 may be fairly high, such as 100 degrees or more or less or alternatively. Alternatively, there may be a high rate of precipitation at the location of the first destination 620 and/or the area of the map information 200. This weather information (e.g. the temperature or rate of precipitation) may be received by the computing devices 110 of the vehicle and/or the server computing devices 410 by other vehicles of the fleet (e.g. vehicle 100A) and/or from third party sources as described above.

Returning to FIG. 9, at block 930, a characteristic is determined based on the weather information. The server computing device 410 and/or the routing system 170 or some other system of the vehicle 100 may determine whether any thresholds are met for the destination either currently or at the time when the vehicle would be expected to reach the destination if following the determined route. Each of these one or more thresholds may be associated with a set of one or more characteristics that can be used to perform a search for a second destination as discussed further below. In this regard, the set of one or more characteristics associated with any thresholds that are met by the weather information may be identified.

For instance, any weather conditions along the route and/or at the first destination may be compared to one or more thresholds. For example, if the weather conditions for the destination location indicate a particular temperature, this temperature may be compared to one or more temperature thresholds. Similarly, if the weather conditions for the destination indicate a particular rate of precipitation, this rate of precipitation may be compared to one or more precipitation rate thresholds. As another example, the Sun's azimuth and elevation may be used to calculate the Sun's location relative to the vehicle. With that, at which area of the vehicle or really, the angle the Sun's light would be shining on the vehicle when the vehicle arrives at the destination may be determined. For example, if the horizon is zero degrees, the threshold would attempt to capture the area that would result in light at the vehicle's door (where a passenger may exit), a such as around 15 to 20 degrees or more or less depending upon elevation as within this range, the light may be blinding or annoying to a passenger. For instance, at angles of approximately 120 degrees, the passenger may actually be located within a shadow of the vehicle. For a visibility threshold for human perception of at least x meters, such as 20 meters or more or less, may be used, even if the vehicle is able to perceive much further. For wind conditions, a threshold of no more than 40 miles per hour wind gusts, such as 20 miles per hour or more or less which may be combined with direction. In this regard, if the vehicle is between the passenger and the source of the wind gusts on a side of the vehicle where the passenger is likely to exit, higher thresholds may be used. For haboobs (wind and dust storms), thresholds which combine a visibility threshold and wind condition thresholds may be used. Similarly, for wind chill conditions, thresholds which combine a minimum temperature and a maximum wind speed may be used. Other thresholds may be used for slippery road conditions (e.g. icy or not, wet or not, water film thickness, or other conditions which may cause a vehicle's wheels to slip), puddles (e.g. a threshold puddle size), and other weather conditions identified in the received weather information.

In some instances, different thresholds may be used for different types of vehicles. For example, tractor-trailers may be associated with threshold rates of precipitation that are lower than threshold rates of precipitation than smaller, passenger vehicles for safety reasons. This may be because the larger tractor-trailers are generally heavier and may be more susceptible to losing control with less rain, snow, etc. than smaller, passenger vehicles.

For example, returning to the example of FIG. 6, where the received weather information indicates that the ambient temperature at the location of the first destination 620 is 100 degrees, this may be compared to a high temperature threshold. If that high temperature threshold is 80 degrees, then the temperature threshold would be met. Alternatively, where the received weather information indicates a rate of precipitation, this may be compared to a rate of precipitation threshold, such as 5 mm of rain per hour or more or less. If the rate of precipitation is greater than the rate of precipitation threshold, then this threshold may be met. Each of the high temperature threshold and the rate of precipitation threshold may be associated with respective sets of characteristics. In this regard, in each example, the comparison may be used to identify the associated set of characteristics.

Returning to FIG. 9, at block 940, a second destination having the characteristic is selected. This second destination is different from the first destination. If a threshold is met, the server computing devices 410 and/or the routing system 170 or some other system of the vehicle may conduct a search for a new, nearby destination having one or more characteristics of the set of one or more characteristics associated with the threshold that was met. Again, this new destination, or the second destination may be different from the first destination. For instance, a high temperature or high precipitation rate threshold may be associated with a set of characteristics including features such as awnings, overhangs, trees or other vegetation, locations where a passenger could enter a building or reach the vehicle from that building quickly, etc. In this regard, if the temperature or rate of precipitation is too high (or rather meets the high temperature or high precipitation rate threshold), the search may include looking in the map information for one or more nearby locations with certain characteristics such as awnings, overhangs, trees or other vegetation, locations where a passenger could enter a building or reach the vehicle from that building quickly, etc. In addition if the rate of precipitation is too high, the search may include looking for nearby locations where the vehicle may be able to wait longer to enable the passenger to "wait it out" for a couple of minutes to see if rain lightens up before entering or exiting a vehicle. For wind, windchill, and haboob conditions, the search may involve looking in the map information for one or more nearby locations where the vehicle is able to position itself so that the passenger enters and exits the vehicle on a side away from the source or the wind (i.e. opposite of the wind direction) to allow the vehicle to "protect" the passenger from the wind and/or dust. If the temperature is too low, the search may look for locations that are closer to building entrances. For sun angle, the search may look for nearby locations where the vehicle would be positioned in order to avoid sun glare and/or in a designated parking spot (e.g. in a parking lot) away from a road to avoid other passing traffic which might not see a passenger entering or exiting a vehicle or vice versa. Similarly, for slippery road conditions and fog, the search may look for locations where the vehicle would be positioned in a designated parking spot (e.g. in a parking lot) away from a road to avoid other passing traffic which might not see a passenger entering or exiting a vehicle or vice versa. As another example, for a puddle, the search may look for nearby locations where puddles are unlikely to be or are just beyond the boundary of the puddle if known from the weather information.

Figure 7:
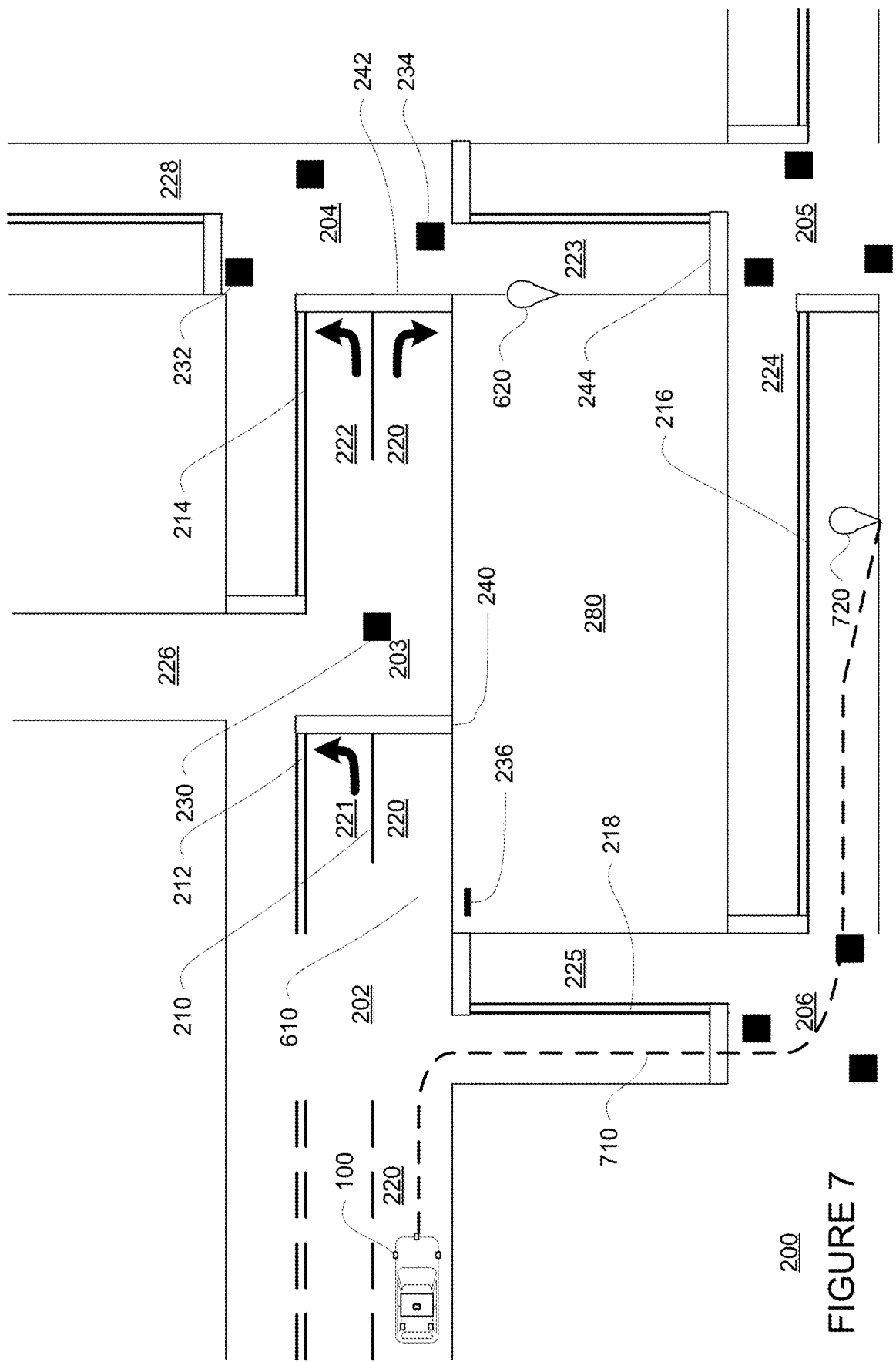
FIG. 7 is an example representation of a second route to a second destination in accordance with aspects of the disclosure.

For example, turning to FIG. 7, a search based on the set of characteristics associated with the high temperature threshold or the rate of precipitation threshold may identify a second destination 720 having characteristics such as awnings, overhangs, trees or other vegetation, locations where a passenger could enter a building or reach the vehicle from that building quickly, etc. As noted above, each of these features may be incorporated into the map information to enable the search.

Returning to FIG. 7, provides an example of a second route 710 to a second destination 720 represented with respect to the map information 200. In this regard, the server computing devices 410 and/or the routing system 170 may determine the second route 710 to the second destination from the current location of the vehicle 100 by selecting the route having the lowest cost as described above. In this example, vehicle 100 may follow the second route 710 to reach the second destination 720 autonomously using the various systems of the vehicle as described above. In this example, like the first destination, this second destination may be a pickup or a drop off destination for a passenger, such as users 442 or 443.

Returning to FIG. 9 at block 950, a second route to the second destination is determined. This second route has a second cost. For instance, the server computing devices 410 and/or the routing system 170 may then determine a second route to the new destination. This second route may be determined in a manner similar to the first route as discussed above. Referring to the example of FIG. 7, the second route 710 may be associated with a second cost "Y" which as noted above may be a sum of all of the nodes and/or edges along the second route.

Returning to FIG. 9, at block 960, the first cost is compared to the second cost. At block 970, the comparison is used to set one of the first destination or the second destination as a current destination for a vehicle to cause the vehicle to control itself in an autonomous driving mode to the current destination. For instance, the overall cost of the second route may be compared to the overall cost of the first route. For example, the first cost X may be compared to the second cost X. If the difference (or the value of Y minus X) is less than a first threshold (e.g. a small difference), the server computing device and/or the routing system may automatically cause the vehicle to follow the second route to the new destination. For instance, the new destination may be set as a current destination for the vehicle. In addition, the vehicle may display a notification to the passenger and/or a notification may be sent to the passenger's client computing device informing the passenger of the change in destination and the reason for the change (i.e. it's hot, so we think it's better to drop you off in the shade). In this way, the vehicle may be seamlessly rerouted to the new destination and thereby improve the rider experience.

If the difference is greater than a second threshold (e.g. a moderate difference), the server computing devices and/or the route system may cause a notification to be displayed to the passenger at the vehicle and/or at the passenger's client computing device requesting that the passenger select either the first destination or the second destination, for example, by providing the passenger with an option to select either the first destination or the second destination. By doing so, the passenger may effectively also select the first route or the second route for the vehicle.

Figure 8B:
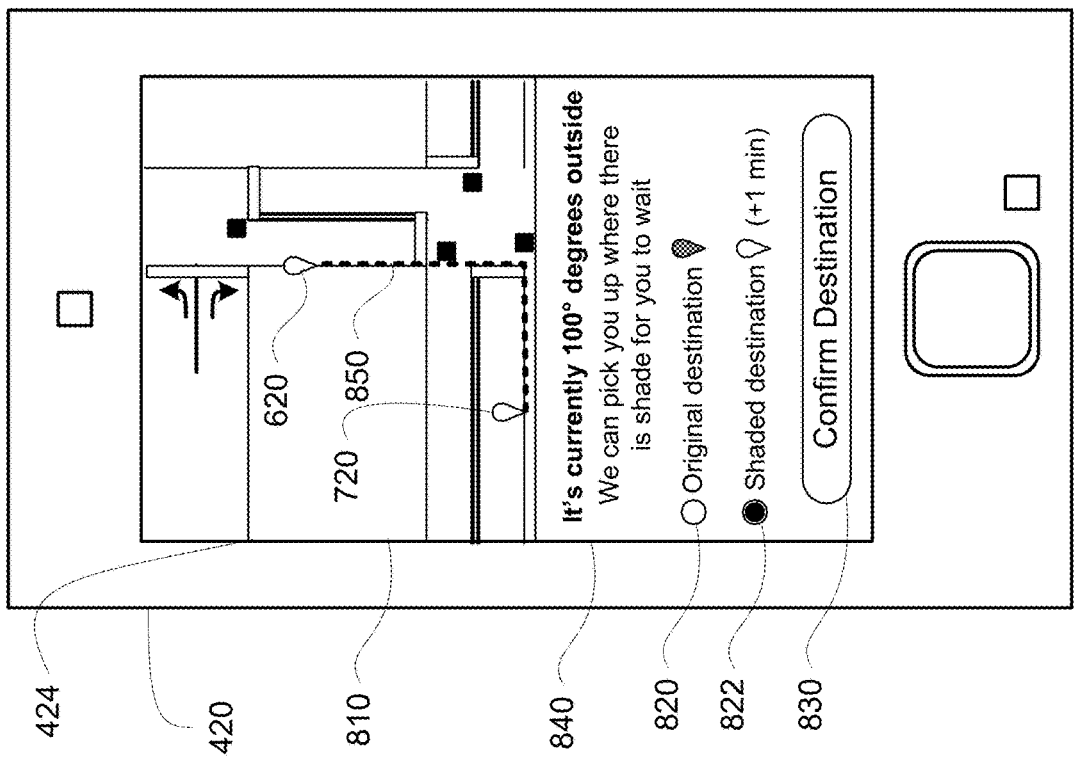
FIGS. 8A and 8B are example visualizations of a notification displayed on a client computing device in accordance with aspects of the disclosure.
Figure 8A:
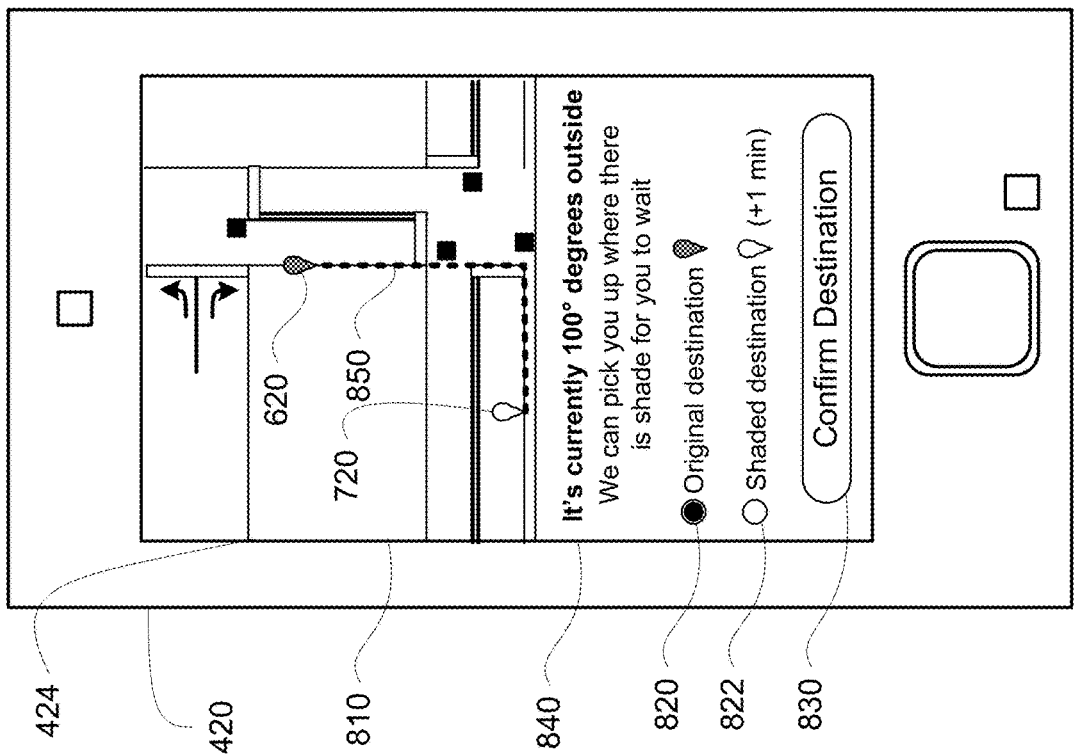

FIGS. 8A and 8B represent example visualizations of a notification 840 and destination options displayed on display 424 of client computing device 420 to an assigned passenger of the vehicle 100. Of course, such visualizations may be displayed, for example, on a display 152 of the vehicle and/or displays 424, 434 of the client computing devices 420, 430 to users 422, 432. As depicted in FIGS. 8A & 8B, the destination options may be provided with some details about each destination, including a map visualization 810 and selection controls such as one or more radio buttons 820, 822 identifying each possible destination option (e.g. each of the first and second destinations 620, 720). The map visualization may be interactive, for example, providing the ability to zoom, a toggle for satellite view, or tapping map pins (such as those for first and second destinations 620, 720) to change the selection of the radio buttons 820, 822.

The notification may also identify information about why that option is being provided (here, because of the ability for the passenger to wait in the shade at the second destination), as well as an explanation of any difference in the estimated time of arrival for the vehicle at the second destination (here an additional 1 minute). The notification also provides a confirm option 830 to enable selection of either the first destination (FIG. 8A) or the second destination (FIG. 8B). In this example, the first and second destination options are being displayed because of high ambient temperatures at the first destination. In addition, the notification 840 also provides walking directions 850 (which may be determined by the server computing devices 410 and/or the routing system 170) to direct the passenger from the second destination 720 to the first destination 620 or vice versa (depending upon whether the first and second destinations are pickup or drop off locations). In this way, when the difference between X and Y is greater, the passenger, or one of users 422, 432, is able to decide which option is most appropriate for the passenger. The passenger may then be able to provide input at the vehicle, for instance via the user input 150, or at the passenger's client computing devices, such as at client computing devices 420, 430, selecting one of the first or second destinations. This input may cause a corresponding signal to be sent to and received by the server computing devices 410 and/or the routing system 170 or another system of the vehicle (e.g. computing devices 110).

In response to the selection, the server computing devices 410 and/or the routing system 170 of the vehicle or another system of the vehicle (e.g. computing devices 110) may cause the vehicle to route itself using the selected route and/or destination. For example, if the aforementioned steps were performed at the server computing devices 410, the server computing devices 410 may send a signal including instructions to cause the vehicle to set the selected destination as the current destination for the vehicle and thereby cause the vehicle to control itself to the selected destination autonomously. These instructions may also include the second route (e.g. so that the vehicle 100 can follow the second route) or may simply allow the vehicle to determine a route to the second destination locally (e.g. using the routing system 170). Alternatively, if the aforementioned steps were performed locally at the vehicle 100, the routing system 170 may simply set the selected destination as the current destination for the vehicle and proceed accordingly.

The initial values for the second threshold may be hand tuned or set as a "best" guess. As the user interacts with them (or doesn't which is also a strong signal) the system may collect information which can be used to improve these guesses. For example, if the second threshold for awnings at 100 degrees or more is too low as 100% of the time the passenger accepts the change. As a counter example, if the second threshold for rain is too high, in heavy downpour, passengers may prefer to just run to the front entrance through the rain than be stranded under an overhang at a further distance.

The notifications may also provide additional information to passengers using the weather information. For example, if the weather information so indicates, the notifications described above or other notifications or information displayed in the application may provide additional details "it's raining hard right now but should get lighter in 2 mins", "visibility is low, so be careful when you step out" or other messages to give the passenger an idea of what will happen when they open the door. If the passenger is waiting to be picked up, the weather information may also be used to generate notifications or display information in the application, for instance, to let a passenger know to stay indoors and then when the weather condition (e.g. precipitation, fog, wind, etc.) improves or is better, suggest an optimal time for the passenger to attempt to reach the vehicle.

Although the examples provided relate to pick up and drop off locations, the features described herein may also be applied to intermediate destinations where a passenger may exit and reenter the vehicle after a period of time as noted above. For example, trips with multiple stops may span a longer period of time, which means the projected weather along a known set of routes will shift over time. In this regard, routes to intermediate destinations and the final destination may vary over time due to changes in received weather information. This may be especially useful for longer trips, such as those for passengers or long-haul deliveries of goods.

In some instances, weather information could be used to increase the cost of edges/nodes in the map information, such as those depicted in FIG. 2B. For example, an area of less downpour or cooler and not as hot, the vehicle's planning system would prefer those nodes in the map information to traverse as those nodes may have lower weights. As another example, extended exposure of the vehicle's systems to over 120 degrees should be avoided, so choosing a route that may be generally cooler such as in the shadow of a mountain or vegetation would protect the system. Or if an area is known to be wetter or have more puddles, the nodes and edges for these areas may be increased, thus, the vehicle may automatically route itself to avoid such locations.

The features described herein may provide an improved user experience for transportation services provided by autonomous vehicles. For instance, by leveraging certain weather information, this can be used to choose better pickup or drop off locations which can greatly delight a customer and deliver more confidence in the advanced capabilities of the transportation service. For example, pickup and drop offs of passengers or goods may be improved by avoiding or reducing the effects of certain weather conditions such as precipitation, sun glare, slippery road conditions, fog, haboobs, temperatures, puddle conditions, etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of providing transportation services with autonomous vehicles, the method comprising:
    determining, by one or more processors, a first route to a first destination, the first route having a first cost of reaching the first destination from a current location of a vehicle;
    while the vehicle is traveling from the current location towards the first destination:
        receiving, by the one or more processors, weather information for the first destination;
        determining, by the one or more processors, a characteristic based on the weather information, wherein the characteristic is configured to reduce an impact of a weather condition on a passenger;
        selecting, by the one or more processors, a second destination having the characteristic, the second destination being different from the first destination;
        determining, by the one or more processors, a second route to the second destination, the second route having a second cost of reaching the second destination from the current location of the vehicle;
        determining, by the one or more processors, a difference between the first cost and the second cost; and
        comparing the difference to a threshold value; and
    based on the comparison of the difference to the threshold value, setting one of the first destination or the second destination as a current destination for the vehicle to cause the vehicle to control itself in an autonomous driving mode to the current destination.

2. The method of claim 1, wherein the first destination is a drop off location for the passenger.

3. The method of claim 1, wherein the first destination is a pick-up location for the passenger.

4. The method of claim 1, wherein the one or more processors are one or more processors of one or more server computing devices and setting the one of the first destination or the second destination as a current destination for the vehicle further includes sending the one of the first destination or the second destination to the vehicle to cause the vehicle to set the one of the first destination or the second destination as the current destination for the vehicle.

5. The method of claim 1, wherein the one or more processors are one or more processors of the vehicle, and the method further includes controlling the vehicle to the current destination in an autonomous driving mode.

6. The method of claim 1, further comprising:
    comparing the weather information to one or more thresholds; and
    using the comparison of the weather information to the one or more thresholds to determine the characteristic.

7. The method of claim 6, wherein the characteristic is associated with one of the one or more thresholds that is met by the weather information.

8. The method of claim 1, wherein the characteristic is a physical feature of the second destination.

9. The method of claim 8, wherein the characteristic offers the passenger protection from the weather condition.

10. The method of claim 1, further comprising, when the difference meets the threshold value, prior to the setting, providing a notification to the passenger requesting that the passenger select between the first destination and the second destination.

11. The method of claim 10, wherein the notification further identifies the weather condition based on the weather information.

12. The method of claim 10, further comprising, receiving a selection in response to the notification, and wherein the received selection is used to set the one of the first destination or the second destination as the current destination of the vehicle.

13. The method of claim 1, wherein when the difference does not meet the threshold value, the second destination is automatically set as the current destination of the vehicle.

14. The method of claim 1, further comprising, when the difference is less the threshold value, automatically setting the second destination as the current destination.

15. The method of claim 1, further comprising, when the difference is greater than the threshold value, prior to the setting:
 comparing the difference to a second threshold value; and
 when the difference is greater than the second threshold value, providing a notification to the passenger requesting that the passenger select between the first destination and the second destination.

16. The method of claim 1, wherein:
 the second destination is selected as the current destination, and
 the method further comprises, while the vehicle is traveling from another current location of the vehicle towards the second destination:
  receiving, by the one or more processors, other weather information for the second destination;
  determining, by the one or more processors, another characteristic based on the other weather information, wherein the other characteristic is configured to reduce the impact of the weather condition on the passenger;
  selecting, by the one or more processors, a third destination having the other characteristic, the third destination being different from the second destination;
  determining, by the one or more processors, a third route to the third destination, the third route having a third cost of reaching the third destination from the other current location of the vehicle;
  determining, by the one or more processors, another difference between the second cost and the third cost; and
  comparing the other difference to the threshold value.

17. The method of claim 16, further comprising, based on the other comparison of the other difference to the threshold value, setting one of the second destination or the third destination as another current destination for the vehicle.

18. A system for providing transportation services with autonomous vehicles, the system comprising one or more processors configured to:
 determine a first route to a first destination, the first route having a first cost of reaching the first destination from a current location of a vehicle;
 while the vehicle is traveling from the current location towards the first destination:
  receive weather information for the first destination;
  determine a characteristic based on the weather information, wherein the characteristic is configured to reduce an impact of a weather condition on a passenger;
  select a second destination having the characteristic, the second destination being different from the first destination;
  determine a second route to the second destination, the second route having a second cost;
  determine a difference between the first cost and the second cost; and
  compare the difference to a threshold value; and
 based on the comparison of the difference to the threshold value, set one of the first destination or the second destination as a current destination for the vehicle to cause the vehicle to control itself in an autonomous driving mode to the current destination.

19. The system of claim 18, wherein the one or more processors are further configured to:
 compare the weather information to one or more thresholds; and
 use the comparison of the weather information to the one or more thresholds to determine the characteristic.

20. The system of claim 19, wherein the characteristic is associated with one of the one or more thresholds that is met by the weather information.

21. The system of claim 18, wherein the one or more processors are further configured to, when the difference meets the threshold value, provide a notification to the passenger requesting that the passenger select between the first destination and the second destination.

22. The system of claim 18, further comprising the vehicle, wherein the processors are processors of the vehicle.

* * * * *